Patented Mar. 3, 1925.

1,528,585

UNITED STATES PATENT OFFICE.

ELIZABETH SZÉCSY, OF NEW YORK, N. Y.

INSULATING MATERIAL FOR COOKING CHESTS AND THE LIKE.

No Drawing. Application filed June 26, 1922. Serial No. 570,783.

*To all whom it may concern:*

Be it known that I, ELIZABETH SZÉCSY, a citizen of Hungary (having declared my intention to become a citizen of the United States), and resident of New York, in the county of New York and State of New York, have invented certain new and useful Insulating Materials for Cooking Chests and the like, of which the following is a specification.

This invention relates to insulating materials for receptacles, such as cooking chests. It has for its main object to provide linings for receptacles adapted to retain sufficient heat and cause it to act for the purpose desired, which in the case of cooking chests are: to receive food stuffs in semi-prepared or partly prepared condition at a high temperature, to automatically finish the process of their preparation while said food stuffs are being kept enclosed in said cooking chest, and to keep said food stuffs in a finished, freshly tasting and hot condition for a comparatively long period of time.

Other objects of the invention are: to provide an insulating lining for the purpose mentioned which will be inexpensive, efficient, light in weight, simple and easy to manufacture, odorless, and which will retain its desirable qualities for an indefinite length of time.

For a full description of the invention and the merits thereof, and also to acquire a knowledge of the details of construction of the same, for effecting the various results mentioned hereinbefore, reference is to be had to the following description.

My novel lining for insulating cooking chests and the like, is prepared in the following way: I take birds' feathers and apply water to them to make them slightly wet. In this condition said feathers are thoroughly treated with powdered charcoal and with a smaller amount of powdered pepper until all the feathers are well and evenly covered with said powders.

The treatment is preferably done by filling the feathers into a sack-like container, adding the powders to them and thoroughly mixing the contents of the sack. I found this the most suitable manner in which the feathers may be handled and evenly covered with the powders. The finished feathers are then filled into containers of highly flexible, light sheet textile materials, like pillow cases, left to dry and in such a state and preferably in such a container I apply them to fill the spaces between the walls of a cooking chest and the usual food containers in it. In a similar manner the cover of such a cooking chest may also be lined with my mixture, applying it under a light, flexible sheet textile cover like an upholstering.

After extensive experiments, I chose birds' feathers for the main ingredient of my insulating material as the most desirable for the above purposes. It is one of the best heat insulating materials—even when in thin layers—it is light in weight, cheap, easy to obtain in any quantities, and shows that high degree of flexibility and elasticity—retaining them even after considerable use—which will be described hereinafter as one of the important characteristics desired in heat insulating linings of receptacles to be opened and closed frequently, like cooking chests are. But the feathers will show these desirable qualities only as long as they are in a clean, healthy condition. Since feathers, as an organic matter, are liable—under the influence of heat—to rot and desintegrate, I further apply the charcoal, which is a well known conserving agent. It also is a high class heat insulator and will fill the spaces within the feathers and increase their insulating qualities. Finally, the charcoal also acts as a deodorizer in case of possible disintegration.

The powdered pepper also is added to my mixture as an additional conserving agent but its main purpose is to exterminate the possible moths in the feathers and to prevent their later access to the same.

The wetting of the feathers is necessitated in order to evenly distribute the powdered matters on them and also to insure that the powders will adhere to the feathers. Otherwise such powders would accumulate at the bottom of the casings in which the feathers are treated and afterwards kept, and only a small portion of the feathers would be thoroughly treated.

The special characteristics of the feathers require their application in casings and in upholstered-like formations and if vacant spaces would remain between the parts of a cooking chest, the food containers therein, and my sometimes unyielding casings filled with the feathers, I preferably fill such vacant spaces with sea grass treated in a like manner as the feathers have been, said sea grass playing a secondary rôle in the heat insulation and being easier to handle.

The above described form of applying my insulating lining and its elastic material consisting of the treated birds' feathers will make—through its elasticity and flexibility—a perfect closure between the cover and the chest proper, as well as around the food containers therein, even after a long use of the same, which is of the highest importance for the proper working of a cooking chest.

I have made numerous experiments with all kinds of insulating materials for the purposes of cooking chests and have found this one only as answering all the requirements of such a use.

My improved insulating material and the method of applying the same have insured the results to be described in this specification as obtained with cooking chests showing my improved lining.

Asbestos mixtures, for instance, are too rigid, apt to form lumps and noninsulating empty spaces in between them and no permanent perfect closing can be obtained with such linings around the food receptacles and under the cover of the chest. I also tried treated cotton mixtures which however did not show sufficient heat insulating power, were not elastic and yielding and also became lumpy.

In using a receptacle such as a cooking chest lined with my improved insulating material, all that is necessary to do is to prepare the food stuff in question in the usual manner, but only partially boiling or cooking the same in a container for such a period of time as it is necessary to raise it to a comparatively high temperature and partially cook it. The partially boiled or cooked food is then immediately in such hot condition placed into the cooking chest provided with my improved lining as described above. The cooking chest is then tightly closed and the food is left in it for such a period of time as it is necessary in order to thoroughly cook said food, such period of time varying according to the nature of the food being cooked. I have discovered that my improved insulating material co-operating with such cooking chests will thoroughly cook the food placed therein and such food will, in addition, retain its hot temperature, tenderness and taste for a comparatively long time in such a receptacle lined with my improved insulating material.

A cooking chest lined with my improved insulating material cooks the food with a fraction of the labor, time and fuel necessary in the ordinary cooking or in the usual cooking chests and it does not necessitate any outside source of heat for the operation of the same, like gas, electricity, heated stones, etc., usually applied within such cooking chests. A cooking chest provided with my improved lining will, for instance, perfectly prepare and finish a meat which has been previously cooked for twenty minutes only, while it is sufficient to boil vegetables for a few minutes before placing them in such a chest and to have them thoroughly and automatically finished therein.

Having thus described my invention, what I claim as new and want to protect by Letters Patent, is:—

A heat insulating material for fireless cookers and the like, consisting of feathers treated with water, powdered charcoal and pepper.

Signed at New York in the county of New York and State of New York this 22nd day of June A. D. 1922.

ELIZABETH SZECSY.